United States Patent [19]  
Zentner et al.

[11] Patent Number: 4,543,777  
[45] Date of Patent: Oct. 1, 1985

[54] METHOD OF MAKING THERMALLY CURABLE WET-IMPREGNATED ROVINGS

[75] Inventors: Mark R. Zentner, Mt. Prospect; Orvid R. Cutler, Rolling Meadows, both of Ill.

[73] Assignee: DeSoto, Inc., Des Plaines, Ill.

[21] Appl. No.: 233,193

[22] Filed: Feb. 10, 1981

Related U.S. Application Data

[62] Division of Ser. No. 152,571, May 22, 1980, abandoned.

[51] Int. Cl.⁴ .................... D06M 15/70; B05D 3/12
[52] U.S. Cl. ........................................ 57/295; 57/297; 427/178; 427/369; 427/434.6
[58] Field of Search ............ 428/392, 35, 36, 392, 428/396; 427/177, 178, 386, 434.6, 369; 57/258, 295, 250, 297

[56] References Cited

U.S. PATENT DOCUMENTS 3,384,505  5/1968  Palmer et al. ................. 427/294
4,147,253  4/1979  Brook et al. ................... 206/205
4,224,541  9/1980  Smith et al. ................ 428/377 X

*Primary Examiner*—Evan K. Lawrence
*Attorney, Agent, or Firm*—Dressler, Goldsmith, Shore, Sutker & Milnamow, Ltd.

[57] ABSTRACT

Thermally curable wet-impregnated rovings are disclosed in which the fibers of the roving are impregnated with a liquid polyepoxide having dispersed therein a latent heat-activatable epoxy curing catalyst, such as dicyandiamide, the polyepoxide dispersion having a room temperature viscosity of from 2000 to 5000 centipoises and a tack of less than about 6 on a Thwing-Albert inkometer. The rovings are produced without organic solvent by passing a dry multifillament roving through an elevated temperature bath of the polyepoxide dispersion, this elevated temperature being insufficient to activate the curing catalyst and functioning to lower the viscosity to enable uniform impregnation. The wet rovings are stored in a supply package.

5 Claims, No Drawings

METHOD OF MAKING THERMALLY CURABLE WET-IMPREGNATED ROVINGS

This is a division, of application Ser. No. 152,571, filed May 22, 1980, abandoned.

TECHNICAL FIELD

The present invention relates to thermally curable wet-impregnated rovings which are useful for the production of fiber composites, and especially to wet-impregnated rovings which are packaged and stored with the resin in liquid form, but which can be removed from the package for use without damage.

BACKGROUND ART

The production of fiber composites using thermally curable impregnated rovings is well known and is taking on increased significance because the fiber composites are light and strong and can be used to form pieces of diverse shape. The production of larger pieces is of particular importance. All sorts of problems have been encountered.

The most direct approach is to use dry rovings and to impregnate them with liquid resin on the way to the fiber composite which is being formed. However, aside from the physical difficulty of doing this, if the liquid resin is of low viscosity, then it runs on the fiber composite producing resin-rich and resin-poor zones in the composite. Neither of these is desirable, and both detract from the strength of the products. On the other hand, if the resin is viscous enough to resist running, then it does not adequately penetrate the filaments in the multifilament roving being impregnated, so once again the final product is deficient. Also, resins are usually tacky liquids, and the tackiness of the resin causes it to stick to textile machinery so that, for example, the wet-impregnated roving cannot be braided. While impregnation on the way to the fiber composite is not a prime aspect of this invention, it is improved by it.

The use of preimpregnated rovings has also become significant. A prime approach in this direction is the use of a thermoplastic overcoat around the roving which is impregnated with thermosetting resin in semi-solid form. Our coworkers at De Soto, Inc. have made considerable progress in this direction as illustrated in application Ser. No. 557,656 filed Mar. 13, 1975, now allowed, and its three divisional applications, U.S. Pat. Nos. 4,187,357 issued Feb. 5, 1980, 4,195,113 issued Mar. 25, 1980, and Ser. No. 067,380 filed Aug. 17, 1979.

In these disclosures dry impregnated rovings which usually include a proportion of relatively expensive thermoplastic resin in the thermosetting impregnant, such as a polysulfone resin, are overcoated with a thermoplastic resin coating which is compatible with the impregnated resin system in a hot melt. The thermoplastic resin adds to the expense of the product, organic solvents are normally needed and must be removed, and the impregnation and coating process is slow and adds to the cost of the product. The opportunity to have an appropriately impregnated roving which can be withdrawn from a supply thereof as needed and handled by textile equipment is advantageous, but there are limitations, some of which have been noted.

Wet-impregnated rovings have also been packaged as illustrated in U.S. Pat No. 4,147,253 issued Apr. 3, 1979. However, the low tack impregnants used in that patent were primarily ultraviolet-curable liquids which are expensive. Also, the ultraviolet-cured products are not as strong as the traditionally used thermally cured products. Also, the liquids used in the patent were of low viscosity, so special winding had to be used to prevent the liquids used from flowing in the package. Such flow is tolerable in the production of composites when ultraviolet light can be used to "freeze" the resin on the formed piece during application of the applied wet-impregnated roving, but this cannot be done very easily for thermally curable liquids, so this limits the effectiveness of the systems shown in the patent.

The present invention overcomes the various problems noted hereinbefore by using wet-impregnated rovings which are thermally curable but which possess low tack at relatively high viscosity even though they can be applied at low viscosity to insure proper penetration of the applied liquid resin in the roving. To do this without employing organic solvent is an important feature of this invention.

DISCLOSURE OF INVENTION

In accordance with this invention, a viscous liquid polyepoxide has dispersed therein a latent heat-activatable epoxy curing catalyst and the mixture is heated to an elevated temperature insufficient to activate the catalyst in order to lower the viscosity. This low viscosity heated mixture is applied to a multi-filament roving to impregnate the same and the so-impregnated roving is then utilized, preferably by winding the same into a supply package. Contact of the heated mixture with the cool filaments in the roving and with the air causes a rapid reduction in the temperature and increases the viscosity. As a result, when the wet impregnated multi-filament roving is wound into a package or applied onto a fiber composite piece, the high viscosity of the cooled polyepoxide mixture prevents it from running.

A point of importance is the finding that latent catalyst-containing liquid polyepoxide mixtures possess low tack, quite unlike the ordinary heat-curable resin mixtures. This low tack uniquely enable the wet-impregnated roving to be handled by textile machinery and to be withdrawn from a wet supply package.

Another point of importance is that the high viscosity prevents running of the liquid mixture, so that it is no longer necessary to utilize a specially wound supply package.

While various latent catalysts can be used, dicyandiamide is particularly applicable since it resists decomposition at a temperature high enough to adequately lower viscosity in the absence of added organic solvent so that the roving can be uniformly impregnated. At the same time, dicyandiamide provides a rapid cure at moderately elevated temperature.

The preferred polyepoxides are liquid or semi-liquid diglycidyl ethers having an epoxide equivalent weight below about 200. Diglycidyl ethers of a bisphenol, such as bisphenol A, are particularly contemplated. These will be illustrated by the Dow product DER-332 which is a viscous liquid having an epoxide equivalent weight of about 175 and an average molecular weight of about 350. The Shell product, Epon 828, is also useful.

As a feature of the invention, a minor proportion of 2% to 20%, based on the total weight of the mixture, of a diglycidyl ether of a polyether of a $C_2$–$C_4$ glycol is added to reduce viscosity. The polyoxyalkylene glycol which is utilized may have a molecular weight up to about 500. These products are illustrated by a diglycidyl ether of polyoxypropylene glycol having an epoxide equivalent weight of 190 and an average molecular weight of about 380. The Dow product DER-736 is particularly useful. It is a low viscosity liquid and it minimizes the temperature needed to provide the low viscosity which enables uniform impregnation without the use of volatile organic solvent. Moreover, low viscosity is provided at elevated temperature and there is a considerable viscosity increase with decreasing temperature which prevents undesirable running.

Of course, a small proportion of volatile organic solvent may be used, but this adds to the expense and it imposes the burden of removing the solvent prior to use or packaging, and this is detrimental.

While organic solvent is preferably absent, any solvent which is selected must be volatile at low temperature so as to avoid decomposing the latent catalyst. Methylene chloride will illustrate a suitable solvent which, if used, should be employed in minimal amount so as to minimize the expense involved.

The latent catalyst-containing liquid polyepoxide mixture should have a tack of less than about 6 on a Thwing-Albert inkometer and a room temperature viscosity of from 2000 to 5000 centipoises, preferably from 3000 to 4000 centipoises.

While dicyandiamide is the preferred latent heat-activatable epoxy curing catalyst, other catalysts falling within this art recognized group are illustrated by trimellitic anhydride, pyromellitic anhydride and chlorendic anhydride. The term "catalyst" as used herein embraces agents which release compounds which react directly with the epoxy group, such as the amines released when dicyandiamide is heated.

The temperature to which the catalyst-containing liquid polyepoxide mixture can be heated in order to reduce its viscosity for effective uniform impregnation without activating the catalyst will depend upon the catalyst which is selected. With dicyandiamide, about 130° F. can be safely used, and while this is not very hot, the rapid viscosity reduction which is experienced is ample to enable uniform impregnation of the roving.

While only moderate temperatures are adequate for viscosity reduction, about 250° F. to about 500° F. cause rapid cure to provide fiber composites which are hard, strong and possess good flexural strength.

The impregnation can be carried out in any convenient fashion, as by running the dry roving through a bath of the heated liquid polyepoxide mixture and then squeezing out excess liquid as the wet roving leaves the bath, or by running the dry roving over a roller coated with the mixture.

The wet roving leaving the bath cools quickly and can be used directly for the formation of fiber composites. In preferred practice, the wet roving is wound into a package in which the wet roving contacts other wet rovings within the package. Appropriate packages are illustrated in U.S. Pat. No. 4,147,253, noted previously, or a simple cop can be wound in normal fashion since the more viscous resin systems in this invention provide enough viscosity to prevent running of the liquid resin. within the package. It will be appreciated that the viscosity is still low enough for the resin to run, but it is in intimate contact with a multiplicity of fibers, and this reduces the flow capacity of the liquid resin Despite the limited viscosity which prevents running within the package, the tack is low enough to permit the wet roving to be withdrawn from the cop with very little damage to the roving.

If the tack-viscosity relationships described herein are not employed, then the wet roving will be damaged as it is withdrawn from a package or as it is contacted by the mechanical implements of textile handling apparatus.

BEST MODE FOR CARRYING OUT THE INVENTION

Dicyandiamide in an amount providing 0.7 equivalents of amine per equivalent of total epoxy functionality is ground into 95 parts of the Dow product DER 332 using a three-roll mill to get a fine dispersion. A small portion of this dispersion has added thereto a catalyst for the epoxy-amine cure, namely, the salt of amidazole with adipic acid. This salt is available under the trade designation ADX-85, and it is added in an amount of 2%, based on the weight of the dicyandiamide. The salt is mixed into the dispersion using a mortar and pestle, and the mixture is then added to the remainder of the dispersion which is then ground to a 3 North Standard grind rating on the Hegman Scale.

The previously prepared dispersion is thinned by the addition of 5 parts of the Dow product DER 736 to provide a catalyzed thermally curable liquid mixture having a viscosity at room temperature of about 3500 centipoises. On heating to 130° F., the viscosity drops sharply to provide a low viscosity liquid in which the dicyandiamide is stable.

Interestingly, this liquid mixture has a tendency to crystallize, forming a crumbly solid on standing at room temperature for four days. However, if this crumbly solid is heated to 130° F., it resumes its low viscosity character and reacquires its about 3500 centipoise viscosity at room temperature.

This low viscosity liquid at 130° F. is used to impregnate multifilament glass roving (250 yars per pound) and impregnation was uniform with good wetting of the fiber surfaces. Impregnation is obtained by passing the dry roving over a roller immersed in a bath of the hot liquid. It is not necessary to squeeze out the excess from the wet roving which leaves the roller since the amount of resin on the roller is controlled to a measured thickness. The wet impregnated roving is then post-twisted (¾ twist per linear inch) and wound onto a 6 inch cop. The resin impregnant in the cop is viscous because the liquid on the fibers cools rapidly to room temperature. No appreciable running is observed on long term standing in the cop, especially since the liquid impregnant becomes more viscous with time so as to require melting prior to use. Satisfactory shelf life is obtained as indicated by testing for six months at 0° F. and 21 days at 68° F. In this example, the resin in the cop slowly becomes more viscous and solidified after about two weeks. However, by heating the wound cop to melt the solid resin, the liquid form and the previously encountered viscosity at room temperature are restored. Regardless of whether the viscosity merely increased or the resin solidifies, melting within a few days prior to cure restores the desired room temperature viscosity.

The wet impregnated roving was easily removed from the wound cop at room temperature with the resin in the viscous liquid form which it possesses shortly after exposure to 130° F., and it was handleable in conventional braiding machines because of its low tack. When applied on a form to provide a fiber composite, the viscous liquid resin impregnant in the superposed rovings flowed together into a unitary mass, thereby expelling air from between the rovings, but the mass of viscous resin did not run in the uncured composite. In this way air is expelled before the uncured composite is placed in an oven for cure. This is advantageous in the production of large pieces since one can be sure that voids have been eliminated before the piece is cured, it being understood that the discovery of a holiday after cure frequently requires that the cured piece be discarded.

The wet fiber composite is then cured in conventional fashion by wrapping it in a nonadherent plastic cover which is placed in an oven for cure. In this invention it is found that while the low viscosity needed for uniform impregnation can be obtained at 130° F., without activating the dicyandiamide for cure, that the desired cure can be obtained using an oven maintained at 250° F. to 300° F. At 300° F. the cure is rapid and the finished fiber composite was hard and has good flexural strength and good shear strength. These properties are measured by winding a rectangular spar, the cured piece containing 32.6% by weight of resin.

To produce larger batches, it is advisable to use a steel ball mill in order to disperse the dicyandiamide and the ADX-85 in the epoxy resin. This is desirably carried out to provide a North Standard grind rating on the Hegman Scale of about 7.

What is claimed is:

1. A method of producing a thermally curable wet-impregnated roving which can be wound into a wet supply package in which the impregnant does not run and from which the wet-impregnated roving can be withdrawn, comprising impregnating untwisted dry multifilament roving with a heated liquid polyepoxide having dispersed therein a latent heat-activatable epoxy curing catalyst, said polyepoxide dispersion having a room temperature viscosity of from 2000 to 5000 centipoises and a tack of less than about 6 on a Thwing-Albert inkometer, said liquid being heated to an elevated temperature which is insufficient to activate said curing catalyst and functioning to lower the viscosity to enable uniform impregnation of the roving in the absence of volatile organic solvent, and then removing any excess impregnant which may be present.

2. A method as recited in claim 1 in which the room temperature viscosity of said polyepoxide dispersion is from 3000 to 4000 centipoises.

3. A method as recited in claim 1 in which said epoxy curing catalyst comprises dicyandiamide, and said heated liquid is maintained at a temperature of about 130° F.

4. A method as recited in any one of claims 1, 2, and 3 in which said polyepoxide dispersion comprises diglycidyl ether of a bisphenol having an epoxide equivalent weight of about 175 in admixture with from 2% to 20% of a diglycidyl ether of polyoxypropylene glycol having an epoxide equivalent weight of about 190, the proportion of said glycol-based polyepoxide being based on the total weight of the polyepoxide dispersion.

5. A method as recited in claim 1 in which the wet-impregnated and removal of any excess impregnant roving is twisted after impregnation and then wound into a supply package.

* * * * *